Jan. 27, 1970  A. A. SNYDER  3,492,169
ELECTRIC STORAGE BATTERY COVER CONSTRUCTION
Filed Oct. 11, 1967
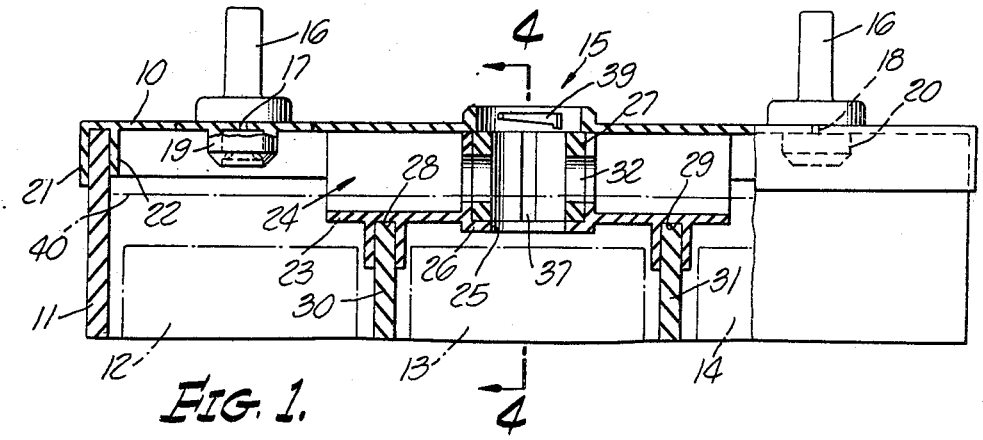
FIG. 1.
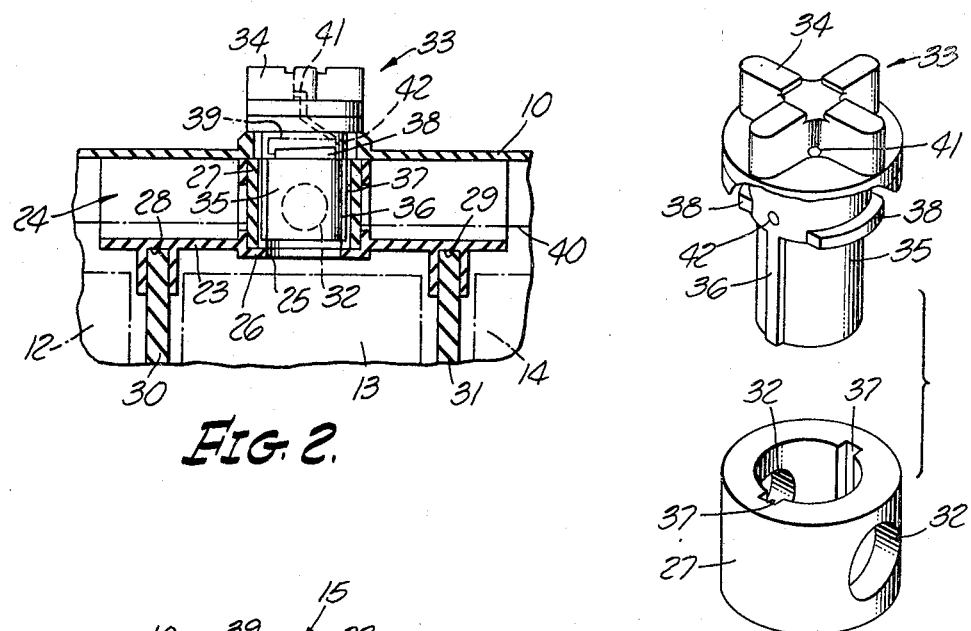
FIG. 2.
FIG. 3.
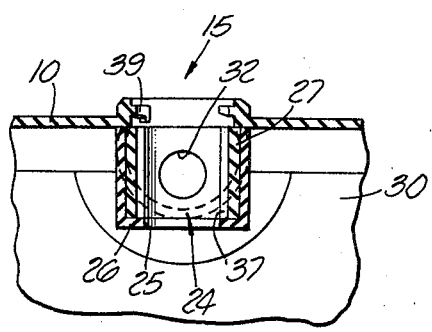
FIG. 4.
ALAN A. SNYDER
INVENTOR
KENDRICK, SUBKOW and STOLZY
BY
*George J. Netter*
ATTORNEY

United States Patent Office

3,492,169
Patented Jan. 27, 1970

3,492,169
ELECTRIC STORAGE BATTERY COVER CONSTRUCTION
Alan A. Snyder, 206 E. Las Tunas Drive,
San Gabriel, Calif. 91776
Filed Oct. 11, 1967, Ser. No. 674,473
Int. Cl. H01m *11/00, 1/02*
U.S. Cl. 136—162                    4 Claims

ABSTRACT OF THE DISCLOSURE

The battery cover has access and closure means. A conduit is affixed to the undersurface of the cover providing communication between the access opening and each of the cell chambers. A sleeve valve is received within the access opening and adjustable to close off outer cells from the access opening upon locking receipt of the closure means within the access opening. When the closure means is removed from the access opening the sleeve valve is automatically positioned to provide through communication with the cells permitting electrolyte or water to be provided to all of the cells as a single application.

---

The present invention relates generally to an electric storage battery cover construction, and, in particular, it relates to a one-piece cover construction that provides for the addition of electrolyte or water to each of a plurality of cells comprising the battery via a single access opening.

BACKGROUND OF THE INVENTION

Heretofore, battery cover constructions for electric storage batteries have included separate filling and venting openings for each cell of the battery. In such batteries, when it becomes necessary to add water or electrolyte, a separate cap or closure means must be removed (and replaced) from each cell in order that the electrolyte or water can then be added to each cell. It is possible with such an arrangement to overfill one of the cells while at the same time either accidentally, or through inadvertence, not provide sufficient electrolyte or water to another cell. The laborious task of removing multiple caps or closures often left this vital service unattended.

It is therefore a primary aim and object of this invention to provide an electric storage battery cover of such construction as to enable the filling of a plurality of battery cells with water or electrolyte via a single inlet opening.

A further object of the invention is to provide a storage battery cover having a single closure means that is removable to permit adding electrolyte or water to all of the storage battery cells as a unit.

SUMMARY OF THE INVENTION

Briefly, the above objects and advantages of the present invention are achieved by providing in the cover of an electric storage battery having a plurality of cells a single access opening through which electrolyte and water may be added. Special conduiting means are affixed to the underside of the top cover of the battery which includes a passageway in communication with each of the cell chambers and the access opening in the cover. A sleeve valve member is received within the cover access opening and is rotatably adjustable within the opening to selectively provide communication with the opening to other cells of the battery via the conduiting means, while through the sleeve bore direct and continuous communication is made with a centralmost cell located opposite the access opening. Plug closure means are received within the sleeve valve and operatively related therewith so that when suitably rotated it causes the valve to move to either the closed or open position as desired. More particularly, the closure means interacts with the sleeve valve so that when removed, the sleeve valve is left in the open position providing full communication with the access openings to all of the cells; and when the closure means is in closed position, the sleeve valve prevents any flow of liquid between the different cells.

Other objects and advantages of the invention will be apparent to those skilled in the art upon consideration of the following description when taken in connection with the showing of the various drawings.

BRIEF DESCRIPTION OF THE DRAWING

FIGURE 1 is a side elevational view, partially in section, of the storage battery cover construction of the present invention illustrated with closure means removed.

FIGURE 2 is a sectional view of the cover construction of FIGURE 1 shown with closure means inserted and in closed relation.

FIGURE 3 is an exploded perspective view of the closure means and valve member.

FIGURE 4 is a sectional view taken along the line 4—4 of FIGURE 1.

DECRIPTION OF A PREFERRED EMBODIMENT

Reference is now made particularly to FIGURE 1, in which there is illustrated a battery cover 10 received onto the casing or housing 11 of a storage battery, showing three cells 12, 13 and 14. In a way that will be more particularly described later, electrolyte or water supplied through a single access opening 15 is simultaneously provided to each of the three cells 12, 13 and 14, such that when the electrolyte, as viewed through the opening 15, reaches a predetermined calibration level, the proper amount of electrolyte is then present in each of the cells.

The upper surface of the cover 10 includes conventional terminals 16 for connection to external utilization equipment (not shown). Vent openings 17 and 18 are provided in the cover for communication through means 19 and 20 on the undersurface of the cover to provide an outlet for gases that may accumulate in the respective cells 12 and 14 during operation of the battery, and a similar venting arrangement for cell 13 is provided in a closure means for the access opening that will be described later. The margins of the cover 10 are formed into downwardly directed wall portions 21 and 22 for being received onto the upwardly directed edges of the casing 11.

Affixed to the undersurface of the cover 10 is an open-ended conduit 23 having a passageway 24 extending completely therethrough, one of the open ends extending into the cell 12 and the other open end communicating with the chamber of cell 14. The lower central portion of the conduit 23 includes an opening 25 with shoulders 26 for supporting the lower end of a cylindrical sleeve valve 27 that extends upwardly through the passageway 24 and into the access opening 15. The lower surface of the conduit 23 adjacent each extremity is formed into notches 28 and 29 for receiving the upper ends of case walls 30 and 31 separating and limiting the cell chamber 13.

As best seen in FIGURE 3, the valve 27 includes in its side walls a pair of openings 32 which are disposed to lie within the passageway 25 when the valve is oriented as is shown in FIGURES 1 and 4. Rotation of the valve 27 to a position ninety degrees from that shown in FIGURE 1, or as depicted in FIGURE 2, shuts off the passageway 25 preventing the flow of fluid through this passageway from one cell to another.

Still with reference to FIGURE 3, the closure means 33 is generally elongated with a cylindrical knob-like portion 34 and a lower cylindrical portion 35 of reduced diameter, the latter being provided with a pair of longitudinally extending keys 36 for receipt within accommodating guide grooves 37 on the inner surface of the sleeve 27. Threads 38 cooperate with corresponding threads 39 on the interior walls of the access opening 15 to retain the closure means within the opening.

Referring now simultaneously to both FIGURES 1 and 2, it is seen that when the closure means is fully threaded within the access opening 15, the bayonet-type threading arrangement orients the valve openings 32 to lie transversely of the passageway 24 thereby closing off access of liquid from any of the cells to any other cell. This is an important feature, since if electrolyte of any two of the cells were permitted to remain in communication for an extended length of time, electrical discharge would result.

Unscrewing and removing the closure means 33 from the access or filler opening rotates the sleeve valve 27 to the position illustrated in FIGURES 1 and 4. Water or electrolyte added through the access opening 15 can now make its way to each of the three cells forming a common liquid level as for example illustrated by the dashed line 40.

As indicated earlier, venting for the cells 12 and 14 is accomplished through openings 17 and 18. Similar venting for the cell 13 is provided by an opening 41 which extends through a baffled portion of the closure means 33 to exit at 42.

Although in the description of a particular embodiment herein it has been assumed that the storage battery was a typical 6-volt variety having three cells, it is not meant to confine the application of the invention to any particular number of cells. In fact, the cover construction of the invention, with minor design changes, can be made to accommodate any number of cells and still remain within the spirit of the invention.

There is provided in accordance with the practice of this invention a storage battery cover construction permitting simultaneous and calibrated filling of all the cells of a storage battery through a single access or filling hole in the cover, thereby eliminating the requirement for unscrewing and replacing a number of cell caps as had been necessary in prior art batteries.

Although but one specific embodiment of the present invention has been described herein and illustrated in the accompanying drawing, many changes and modifications will suggest themselves to those skilled in the art. The particular embodiment chosen has been selected for the purpose of illustration only. The present invention, should, therefore, not be limited to the embodiment so selected, the true scope of the invention being measured instead by the appended claims.

I claim:

1. In an electric storage battery having a plurality of cells; a cover common to at least two of the cells; a filler opening in the cover valving means received within the filler opening selectively adjustable to a first position to conduct fluid added through the filler opening to both cells and to a second position isolating the cells from one another; and cap closure means received within the filler opening for covering the same and including parts for cooperating with the valving means to actuate said valving means upon rotative movement of the cap closure means; said cap closure means including a cylindrical plug that is received within the filler opening, the parts for cooperating with the valving means comprising at least one projection key extending longitudinally of the cylindrical plug on its outer surface, said key being received within an accommodating groove of the valving means.

2. In an electric storage battery having three cells in side-by-side arrangement; a cover; wall portions of the cover defining a filler opening in registry with the middle cell; a hollow open-ended tubular member affixed to the underside of the cover the open ends in communication with respective outermost cells, a transverse opening in the tubular member directly relating the filler opening and middle cell; a hollow sleeve valve rotatably mounted within the transverse opening with its bore aligned therewith, the ends of the valve abutting against the tubular member and cover respectively, said valve including a pair of aligned valving openings in the walls which are brought into registry with the tubular member bore upon rotative adjustment of the valve to a first position and said openings positioned at a second position which is substantially 90-degrees from registry with the tubular member bore and a cap closure member removably positioned within the filler opening and operatively related with the valve for selectively positioning the valve to the first position upon removal.

3. In combination: a storage battery having a plurality of cells in a casing; a cover for the casing having an opening therein; conduit means carried by the cover providing communication between the cells and cover opening; closure and valving means receivable within the cover opening for controlling the communication between the cells and including a sleeve valve received within the cover opening and having portions operatively related with the conduit means, the sleeve valve being selectively adjustable to a first position closing off communication between the cells and to a second position providing communication between the cells.

4. In combination as in claim 3, in which the closure and valving means further includes a removable plug member received within the cover opening and connected with the sleeve valve, the plug member being manipulable to place the sleeve valve in either of its two operative positions.

References Cited

UNITED STATES PATENTS

| | | | |
|---|---|---|---|
| 1,416,327 | 5/1922 | Blair | 136—177.3 |
| 1,633,224 | 6/1927 | Ogden | 136—163.5 |
| 2,259,158 | 10/1941 | Flikkie | 136—178.6 |

ALLEN B. CURTIS, Primary Examiner

D. L. WALTON, Assistant Examiner

U.S. Cl. X.R.

136—170